(12) United States Patent
Toyohira et al.

(10) Patent No.: US 10,160,283 B2
(45) Date of Patent: Dec. 25, 2018

(54) ELECTROMAGNETIC DAMPER SYSTEM

(71) Applicant: HONDA MOTOR CO., LTD., Tokyo (JP)

(72) Inventors: Tomoya Toyohira, Wako (JP); Takafumi Kato, Wako (JP); Satoshi Ohno, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/460,730

(22) Filed: Mar. 16, 2017

(65) Prior Publication Data

US 2017/0267051 A1 Sep. 21, 2017

(30) Foreign Application Priority Data

Mar. 16, 2016 (JP) .................. 2016-051966

(51) Int. Cl.
*B60G 17/06* (2006.01)
*B60G 17/015* (2006.01)
*B60G 17/00* (2006.01)
*B60G 17/019* (2006.01)

(52) U.S. Cl.
CPC .......... *B60G 17/06* (2013.01); *B60G 17/0152* (2013.01); *B60G 17/01933* (2013.01)

(58) Field of Classification Search
CPC .......... B60G 17/0152; B60G 17/01933; B60G 17/06
See application file for complete search history.

(56) References Cited

U.S. PATENT DOCUMENTS

| | | | | |
|---|---|---|---|---|
| 4,770,438 A | * | 9/1988 | Sugasawa | B60G 17/0165 180/169 |
| 4,838,574 A | * | 6/1989 | Baraszu | B60G 17/0165 280/5.515 |
| 5,091,679 A | * | 2/1992 | Murty | B60G 17/0157 180/165 |
| 5,697,634 A | * | 12/1997 | Kamimae | B60G 13/003 280/124.108 |
| 5,718,446 A | * | 2/1998 | Fuchida | B60G 17/0164 280/124.157 |

(Continued)

FOREIGN PATENT DOCUMENTS

JP 2010-253989 A 11/2010

*Primary Examiner* — Tyler J Lee
(74) *Attorney, Agent, or Firm* — Westerman, Hattori, Daniels & Adrian, LLP

(57) ABSTRACT

A relative velocity between a sprung mass and an unsprung mass of a vehicle is calculated by differentiating a stroke amount of an electromagnetic damper with respect to time. The relative velocity is compared with a predetermined value that is set in advance, and a determination is made whether or not the relative velocity is the predetermined value or higher. In a case where the relative velocity is lower than the predetermined value (relative velocity<predetermined value), a normal filter is selected, and a gain G of only an unsprung resonance frequency range is increased. On the other hand, in a case where the relative velocity is the predetermined value or higher (relative velocity≥predetermined value), a delay inhibition filter is selected, and a gain of a high frequency range is increased compared to the normal filter.

2 Claims, 6 Drawing Sheets

(56) References Cited

U.S. PATENT DOCUMENTS

| | | | | |
|---|---|---|---|---|
| 5,779,009 A * | 7/1998 | Iwasaki | ............... | B62D 33/0608 |
| | | | | 701/37 |
| 5,839,082 A * | 11/1998 | Iwasaki | ................ | B60G 17/015 |
| | | | | 701/38 |
| 5,999,868 A * | 12/1999 | Beno | .................. | B60G 17/0165 |
| | | | | 280/5.5 |
| 7,005,816 B2 * | 2/2006 | Hio | ...................... | F16F 15/035 |
| | | | | 188/266 |
| 7,270,335 B2 * | 9/2007 | Hio | ................... | B60G 17/0157 |
| | | | | 280/5.5 |
| 7,962,261 B2 * | 6/2011 | Bushko | ............. | B60G 17/0157 |
| | | | | 280/5.507 |
| 8,321,087 B2 * | 11/2012 | Hayashi | ............... | B60G 17/018 |
| | | | | 180/902 |
| 8,598,831 B2 * | 12/2013 | Ogawa | .................. | B60G 17/06 |
| | | | | 318/139 |
| 8,843,274 B2 * | 9/2014 | Ogawa | .................. | B60G 13/02 |
| | | | | 701/37 |
| 8,914,193 B2 * | 12/2014 | Ogawa | ................ | B60G 17/016 |
| | | | | 701/37 |
| 2004/0150361 A1 * | 8/2004 | Hio | ...................... | F16F 15/035 |
| | | | | 318/375 |

\* cited by examiner

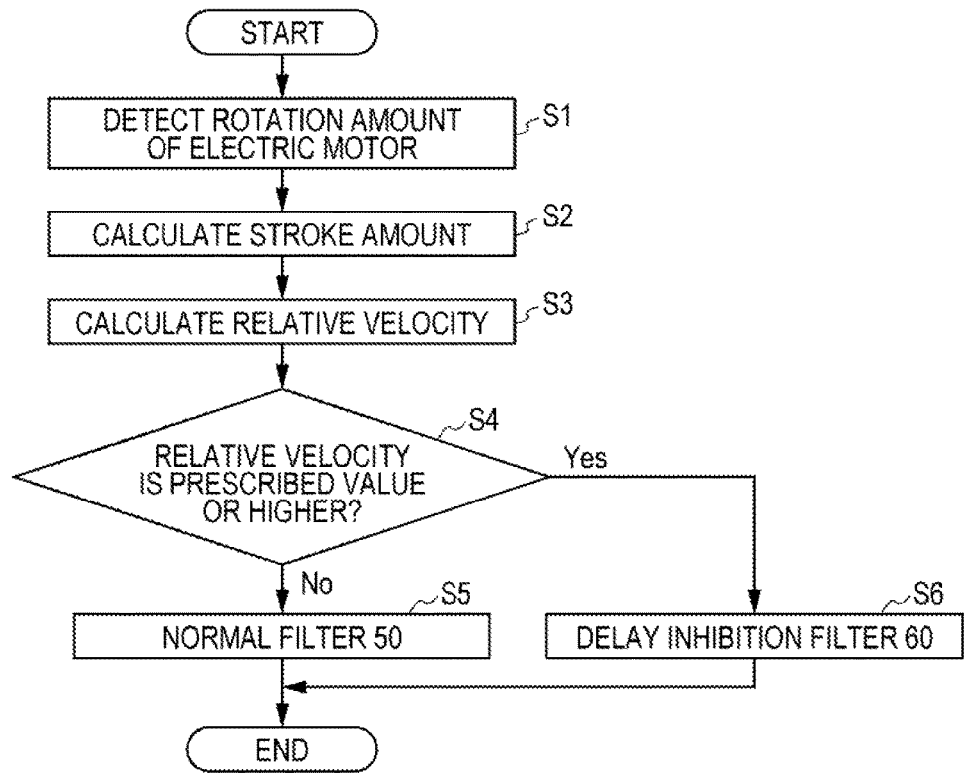
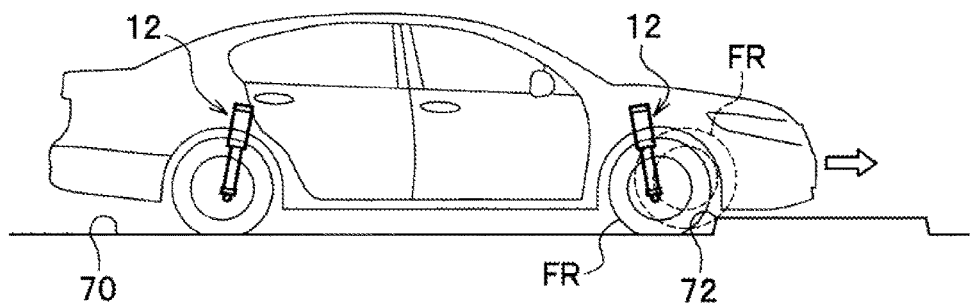

RELATIVE VELOCITY: LOW

RELATIVE VELOCITY: HIGH

ELECTROMAGNETIC DAMPER SYSTEM

CROSS REFERENCES TO RELATED APPLICATIONS

The present application claims priority under 35 U.S.C. § 119 to Japanese Patent Application No. 2016-051966, filed Mar. 16, 2016, entitled "Electromagnetic Damper System." The contents of this application are incorporated herein by reference in their entirety.

BACKGROUND

1. Field

The present disclosure relates to an electromagnetic damper system that includes an electromagnetic damper which produces a vibration damping force.

2. Description of the Related Art

In recent years, in order to improve riding comfortableness of the vehicle, study and development of an electromagnetic damper that is capable of actively controlling a vibration damping force have been advanced. For example, Japanese Unexamined Patent Application Publication No. 2010-253989 discloses a damper system in which a propulsive force production device (the electromagnetic damper) which produces propulsive forces for a sprung mass and an unsprung mass and controls relative movement between the sprung mass and the unsprung mass is in parallel connected with a hydraulic damper in related art.

In general, as for a target vibration damping force (control of an unsprung vibration) that is requested of the electromagnetic damper, the relative velocity between the sprung mass and the unsprung mass is calculated from a damper stroke, and the target vibration damping force is decided based on the calculated relative velocity.

SUMMARY

Incidentally, an electromagnetic damper that produces a vibration damping force by a rotational driving force of a motor has a proper response of the motor and is thus capable of producing the vibration damping force in a wide frequency band from a low frequency to a high frequency. However, because of the properties of the motor, an operating sound of the motor occurs in a high frequency range (a vibration at 50 Hz or higher, for example).

The occurrence of the operating sound of the motor may lower the marketability of a vehicle. Thus, a system that has both of the electromagnetic damper and a hydraulic damper uses a measure such as applying a filtering process to the target vibration damping force of the electromagnetic damper in the high frequency range.

In a system that uses only the electromagnetic damper to achieve size reduction of a damper system, the filtering process is performed for the target vibration damping force of the electromagnetic damper in the high frequency range, and an influence by the operating sound of the motor may thereby be reduced. However, in the system that uses only the electromagnetic damper, the vibration damping force may be produced too late for an input at a high input velocity of the vibration, and the riding comfortableness of the vehicle may be lowered.

It is desirable to provide an electromagnetic damper system that is capable of improving riding comfortableness of a vehicle even in a case where a vibration at a high input velocity is input.

An electromagnetic damper system according to one aspect of the present disclosure includes: an electromagnetic damper that produces a vibration damping force by a driving force of an electric motor; a relative velocity detection unit that detects a relative velocity between a sprung mass and an unsprung mass of a vehicle; a filter unit that performs a filtering process of increasing a gain characteristic of an unsprung resonance frequency range and of decreasing gain characteristics of other frequency ranges with respect to the relative velocity which is detected by the relative velocity detection unit; and a target vibration damping force determining unit that decides a target vibration damping force which is produced by the electromagnetic damper based on a relative velocity which passes through the filter unit, and in a case where the relative velocity that is detected by the relative velocity detection unit is a predetermined value or higher, a gain characteristic of a filter that is used in the filter unit is changed to increase in a high frequency range.

An electromagnetic damper system according to another aspect of the present disclosure includes: an electromagnetic damper that produces a vibration damping force by a driving force of an electric motor; a relative velocity detection unit that detects a relative velocity between a sprung mass and an unsprung mass of a vehicle; a target vibration damping force determining unit that decides a target vibration damping force which is produced by the electromagnetic damper based on the relative velocity which is detected by the relative velocity detection unit; and a filter unit that performs a filtering process of increasing a gain characteristic of an unsprung resonance frequency range and of decreasing gain characteristics of other frequency ranges with respect to the target vibration damping force which is determined by the target vibration damping force determining unit, and in a case where the relative velocity that is detected by the relative velocity detection unit is a predetermined value or higher, a gain characteristic of a filter that is used in the filter unit is changed to increase in a high frequency range.

The techniques of the present disclosure enable the damper system that does not include the hydraulic damper but includes only the electromagnetic damper to suppress the operating sound of the electric motor of the electromagnetic damper via the filtering process in a case where the relative velocity is low and to reduce a time delay in a high frequency range by a high gain that is changed in a case where the relative velocity is the predetermined value or higher.

Accordingly, the techniques of the present disclosure may activate the vibration damping force by the electromagnetic damper without a delay against a single protrusion input due to a bump on a road surface, for example. As a result, even in a case where a vibration at a high input velocity such as the single protrusion input is input, the techniques of the present disclosure may improve the riding comfortableness of the vehicle by damping the vibration at the high input velocity by the electromagnetic damper. The word "unit" used in this application may mean a physical part or component of computer hardware or any device including a controller, a processor, a memory, etc., which is particularly configured to perform functions and steps disclosed in the application.

BRIEF DESCRIPTION OF THE DRAWINGS

FIG. 5 is a flowchart that illustrates a flow of control for obtaining the target vibration damping force from the stroke amount in this embodiment.

FIG. 6 is an explanatory diagram that is provided for explanation of a single protrusion input.

DESCRIPTION OF THE PREFERRED EMBODIMENTS

Figure 1:
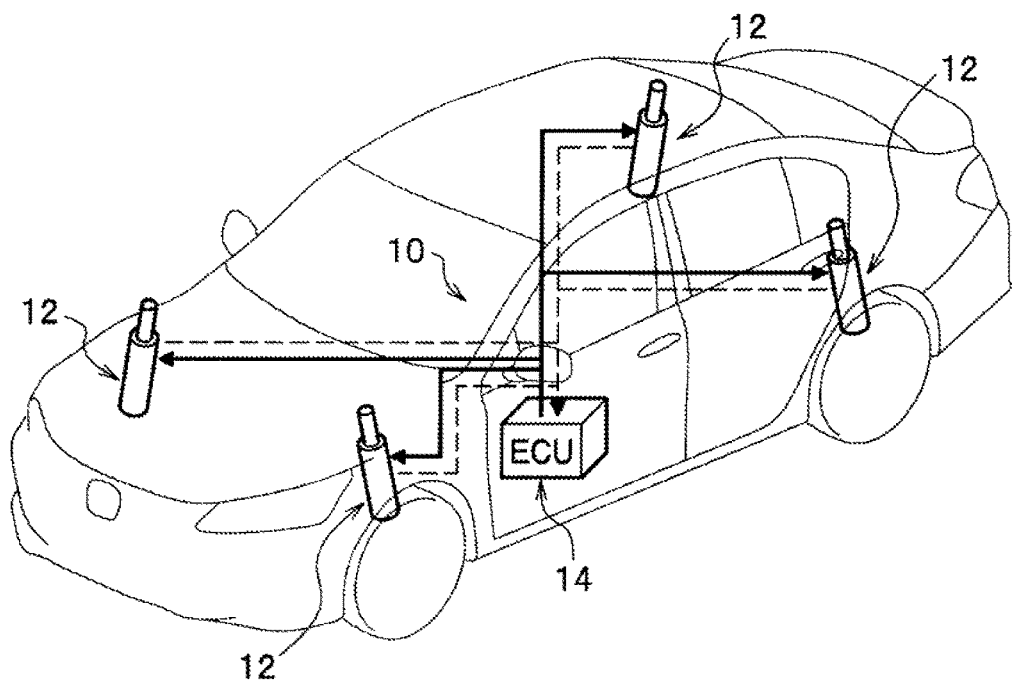
FIG. 1 is a schematic configuration diagram of a state where an electromagnetic damper system according to an embodiment of the present disclosure is installed in a vehicle.
Figure 2:
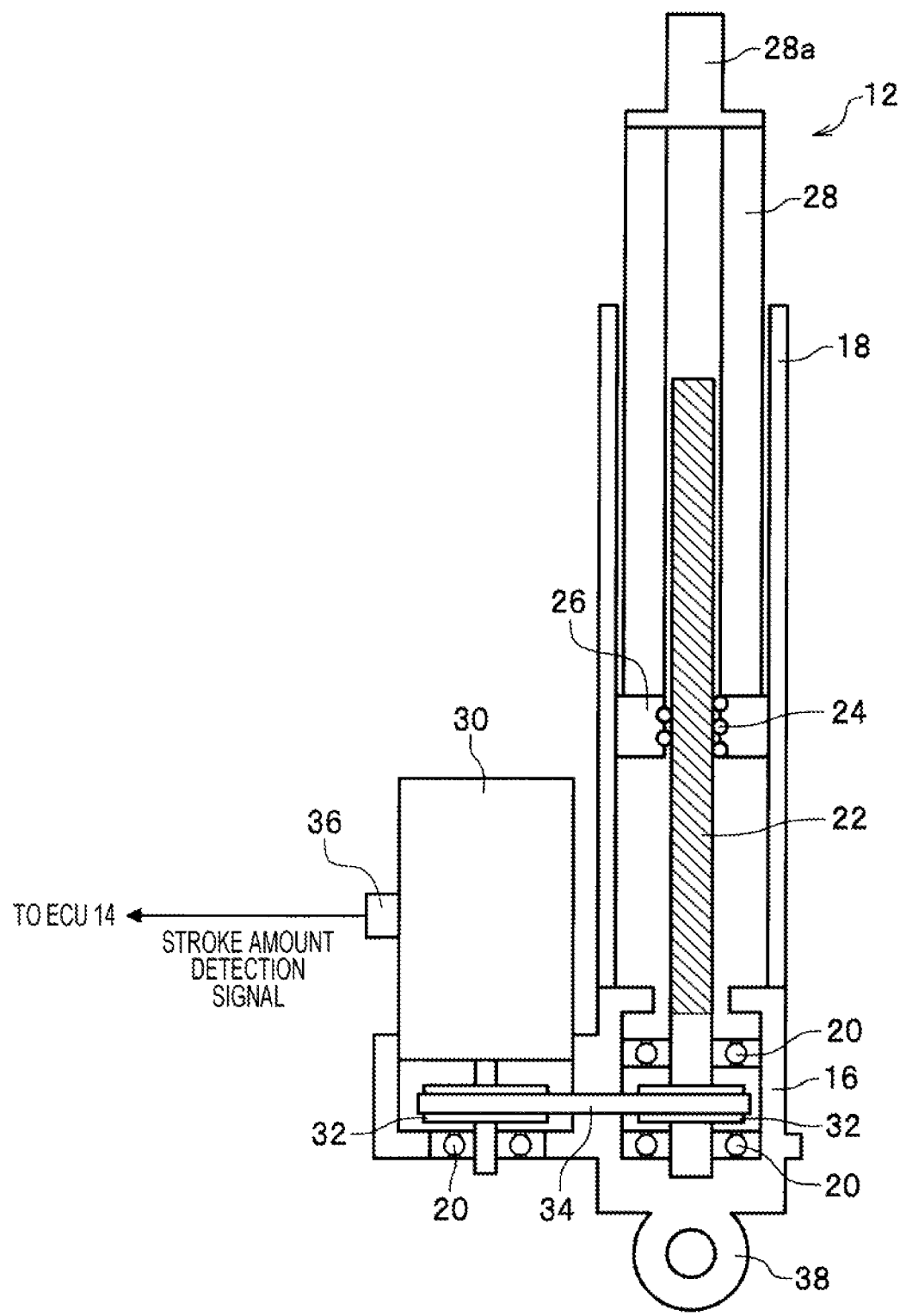
FIG. 2 is a partial cross-sectional structure diagram of an electromagnetic damper that is illustrated in FIG. 1.
Figure 3:
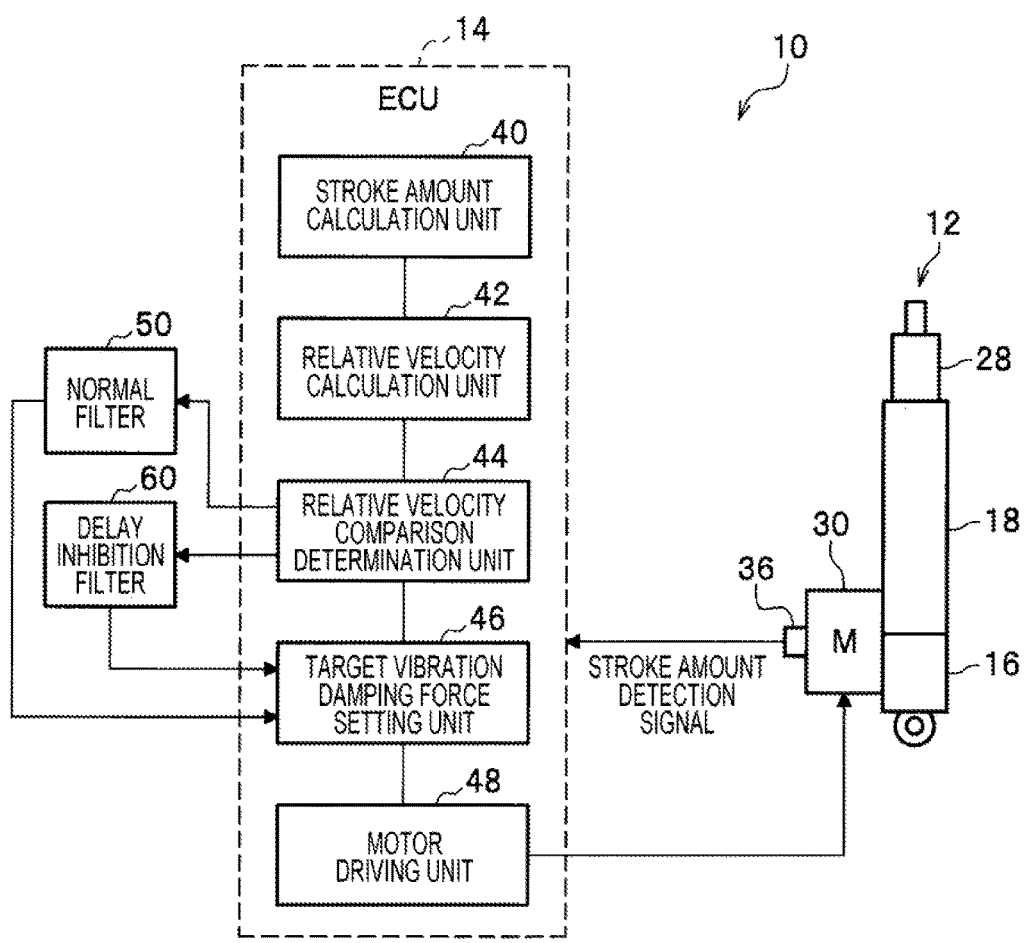
FIG. 3 is a configuration block diagram of the electromagnetic damper system.

An embodiment of the present disclosure will next be described in detail appropriately with reference to drawings. FIG. 1 is a schematic configuration diagram of a state where an electromagnetic damper system according to the embodiment of the present disclosure is installed in a vehicle. FIG. 2 is a partial cross-sectional structure diagram of an electromagnetic damper that is illustrated in FIG. 1. FIG. 3 is a configuration block diagram of the electromagnetic damper system.

As illustrated in FIG. 1, an electromagnetic damper system 10 according to this embodiment that is installed in the vehicle is configured to include plural electromagnetic dampers 12 and an electronic control unit (hereinafter referred to as ECU) 14. In this embodiment, four electromagnetic dampers 12 are arranged for both of front wheels (a left front wheel and a right front wheel) and rear wheels (a left rear wheel and a right rear wheel). However, embodiments are not limited to this, but the electromagnetic dampers 12 may be arranged only for the front wheels (the left front wheel and the right front wheel) or only for the rear wheels (the left rear wheel and the right rear wheel), for example.

In FIG. 1, bold solid lines indicate motor control signals that are output from the ECU 14 to electric motors (described later) which drive the electromagnetic dampers 12, broken lines indicate stroke amount detection signals that are output from resolvers (described later) which detect stroke amounts of the electromagnetic dampers 12 to the ECU 14.

In this embodiment, each of the electromagnetic dampers 12 is formed in the same structure and is attached in a state where the electromagnetic damper 12 is inverted between a member on a suspension side and a member on a vehicle body side. As illustrated in FIG. 2, the electromagnetic damper 12 has a damper housing 16, an outer tube 18 that is coaxially coupled with the damper housing 16, a ball screw shaft 22 that is pivotally supported rotatably in the outer tube 18 via bearings 20, and plural balls 24 that roll along thread grooves of the ball screw shaft 22.

In addition, the electromagnetic damper 12 includes a nut 26 that engages with the ball screw shaft 22 via the plural balls 24 and converts rotary movement of the ball screw shaft 22 into linear movement, an inner tube 28 that is coupled with the nut 26 and is displaced along the axial direction of the outer tube 18 integrally with the nut 26, an electric motor 30 that is juxtaposed on the outside of the outer tube 18, and a belt 34 that is suspended across a pair of pulleys 32 which are respectively mounted on a motor shaft 30a of the electric motor 30 and on the ball screw shaft 22 and that transmits a rotational driving force of the electric motor 30 to the ball screw shaft 22.

A resolver (relative velocity detection unit) 36 that detects the rotation amount of the electric motor 30 is housed in an internal portion of the electric motor 30. The rotation amount of the electric motor 30 that is detected by the resolver 36 is input to the ECU 14 as the stroke amount detection signal (see FIG. 3). Further, the rotational driving of the electric motor 30 is controlled in accordance with a control signal that is output from the ECU 14. In this embodiment, the motor shaft 30a of the electric motor 30 and the ball screw shaft 22 are arranged substantially in parallel, and the dimension of the electromagnetic damper 12 in the up-down direction is thereby shortened. However, the motor shaft 30a and the ball screw shaft 22 may be arranged coaxially and coupled together.

An upper end portion 28a of the inner tube 28 is coupled with and fixed to a member on the vehicle body side which is not illustrated. A coupling portion 38 that is coupled with and fixed to a member on the suspension side (such as a lower arm or a knuckle, for example), which is not illustrated, is provided in a lower end portion of the damper housing 16.

For example, in a case where a vibration is input from a wheel side of the vehicle to the coupling portion 38 and where an upward propulsive force is applied to the coupling portion 38, the inner tube 28 and the nut 26 integrally drop with respect to the outer tube 18, and the ball screw shaft 22 tends to rotate. In this case, the rotational driving force of the electric motor 30 that is urged via a power source, which is not illustrated, is transmitted to the ball screw shaft 22 via the belt 34, a reaction force is produced against the ball screw shaft 22, and the vibration from the wheel side to the vehicle body side may thereby be damped.

As illustrated in FIG. 3, the ECU 14 has a stroke amount calculation unit 40, a relative velocity calculation unit 42, a relative velocity comparison determination unit 44, a target vibration damping force setting unit 46, and a motor driving unit 48.

The stroke amount calculation unit 40 computes the stroke amount of the electromagnetic damper 12 based on the stroke amount detection signal (a rotational speed of the electric motor 30) that is output from the resolver 36.

The relative velocity calculation unit 42 differentiates the stroke amount computed by the stroke amount calculation unit 40 with respect to time and thereby computes the relative velocity between a sprung mass and an unsprung mass of the vehicle.

The relative velocity comparison determination unit 44 compares the relative velocity computed by the relative velocity calculation unit 42 with a predetermined value that is in advance stored in a storage unit which is not illustrated and thereby determines whether or not the relative velocity is the predetermined value or higher. The relative velocity comparison determination unit 44 selects either one of a normal filter 50 and a delay inhibition filter 60, which will be described later, in accordance with whether or not the relative velocity is the predetermined value or higher.

The target vibration damping force setting unit 46 sets a target vibration damping force based on a map about relationship characteristic between a stroke velocity and a load, the map being stored in the storage unit which is not illustrated.

The motor driving unit 48 functions as a so-called driver that drives the electric motor 30, controls the electric motor 30 by control signals (electric signals), and may thereby obtain the target vibration damping force that is set by the target vibration damping force setting unit 46.

The electromagnetic damper system 10 according to this embodiment is basically configured as described above. Actions and effects thereof will next be described.

Figure 4:
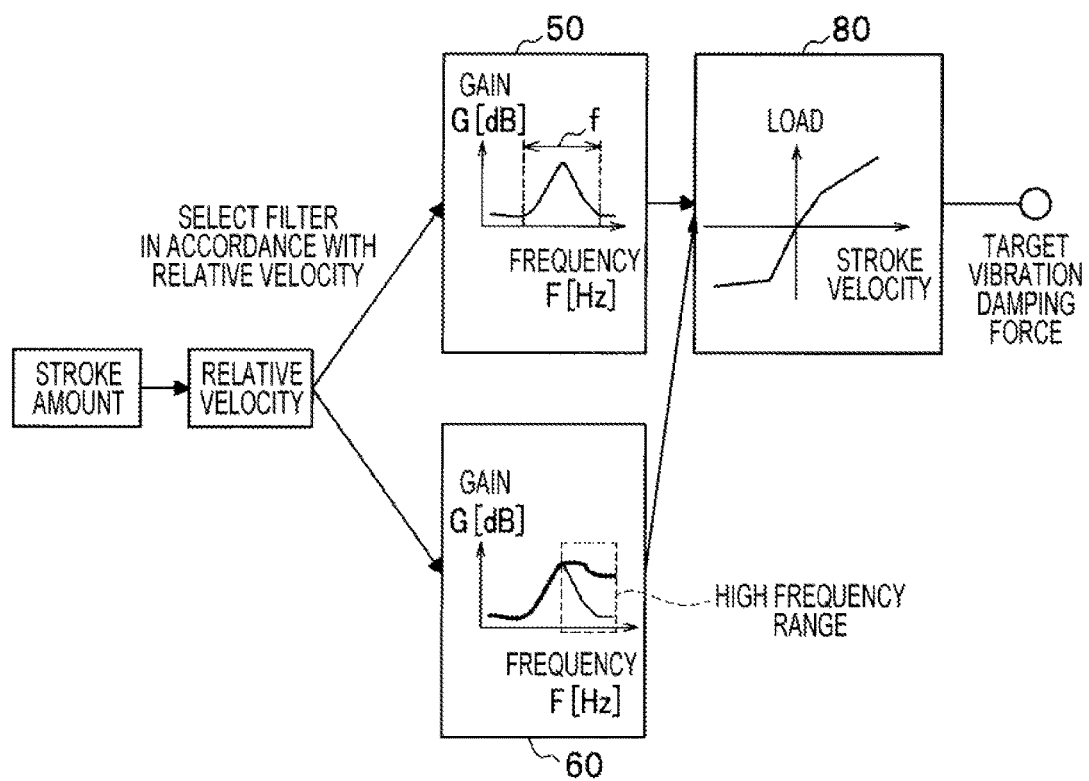
FIG. 4 is an explanatory diagram that illustrates control contents for obtaining a target vibration damping force from a stroke amount in this embodiment.

FIG. 4 is an explanatory diagram that illustrates control contents for obtaining the target vibration damping force from the stroke amount in this embodiment. FIG. 5 is a flowchart that illustrates a flow of control for obtaining the target vibration damping force from the stroke amount in this embodiment. FIG. 6 is an explanatory diagram that is provided for explanation of a single protrusion input.

In FIG. 4, as a filter that functions as a filter unit, two filters (the normal filter 50 and the delay inhibition filter 60) whose gain characteristics are different from each other are used. The normal filter 50 is a band-pass filter and performs a filtering process for increasing a gain G of an unsprung resonance frequency range (f) and for decreasing the gains G of other frequency ranges except the unsprung resonance frequency range (f). Meanwhile, the delay inhibition filter 60 is set to increase the gain G in a high frequency range compared to the normal filter 50.

In this embodiment, as illustrated in FIG. 3, the normal filter 50 and the delay inhibition filter 60 are configured with analog type filters as separate bodies from the ECU 14. However, embodiments are not limited to this. For example, the normal filter 50 and the delay inhibition filter 60 may be configured with digital equivalent circuits provided in the ECU 14, and either one of those may be selected by software which is not illustrated.

The rotation amount (the rotational speed) of the electric motor 30 is first detected by the resolver 36 (step S1), and the stroke amount detection signal detected by the resolver 36 is input to the ECU 14. The stroke amount calculation unit 40 of the ECU 14 computes the stroke amount of the electromagnetic damper 12 (see FIG. 4) based on the rotation amount of the electric motor 30 (step S2). Next, the relative velocity calculation unit 42 differentiates the stroke amount computed by the stroke amount calculation unit 40 with respect to time, thereby calculates the relative velocity (see FIG. 4) between the sprung mass and the unsprung mass of the vehicle (step S3), and outputs the relative velocity to the relative velocity comparison determination unit 44.

The relative velocity comparison determination unit 44 compares the relative velocity computed by the relative velocity calculation unit 42 with the predetermined value that is in advance stored in the storage unit which is not illustrated and thereby determines whether or not the relative velocity is the predetermined value or higher (step S4). In a case where the relative velocity is lower than the predetermined value (relative velocity<predetermined value), the relative velocity comparison determination unit 44 selects the normal filter 50 (step S5) and increases the gain G of only the unsprung resonance frequency range (f). On the other hand, in a case where the relative velocity is the predetermined value or higher (relative velocity≥predetermined value), the relative velocity comparison determination unit 44 selects the delay inhibition filter 60 (step S6) and increases the gain of the high frequency range compared to the normal filter 50.

After the filtering process by either one of the normal filter 50 or the delay inhibition filter 60 is finished, the target vibration damping force setting unit 46 further sets the target vibration damping force based on a map 80 (see FIG. 4) about the relationship characteristic between the stroke velocity and the load, the map being stored in the storage unit which is not illustrated, and finishes the control.

As a case where the relative velocity is the predetermined value or higher and the delay inhibition filter 60 is selected (relative velocity≥predetermined value), for example, as illustrated in FIG. 6, the single protrusion input may be considered in which a right front wheel FR of the traveling vehicle comes into contact with a bump 72 on a road surface 70 and a substantially upward impact load (propulsive force) is applied to the electromagnetic damper 12.

The electromagnetic damper system 10 according to this embodiment does not include a hydraulic damper in related art but includes only the electromagnetic damper 12. The electromagnetic damper system 10 may suppress an operating sound of the electric motor 30 of the electromagnetic damper 12 via the filtering process by the selected normal filter 50 in a case where the relative velocity is low and may increase the gain G in the high frequency range by a high gain G that is changed by the selected delay inhibition filter 60 in a case where the relative velocity is the predetermined value or higher.

Accordingly, in this embodiment, the vibration damping force by the electromagnetic damper 12 may be activated without a delay against the single protrusion input due to the bump 72 on the road surface 70 as illustrated in FIG. 6. As a result, in this embodiment, even in a case where a vibration at a high input velocity such as the single protrusion input is input, the riding comfortableness of the vehicle may be improved by damping the vibration at the high input velocity by the electromagnetic damper 12.

Figure 7:
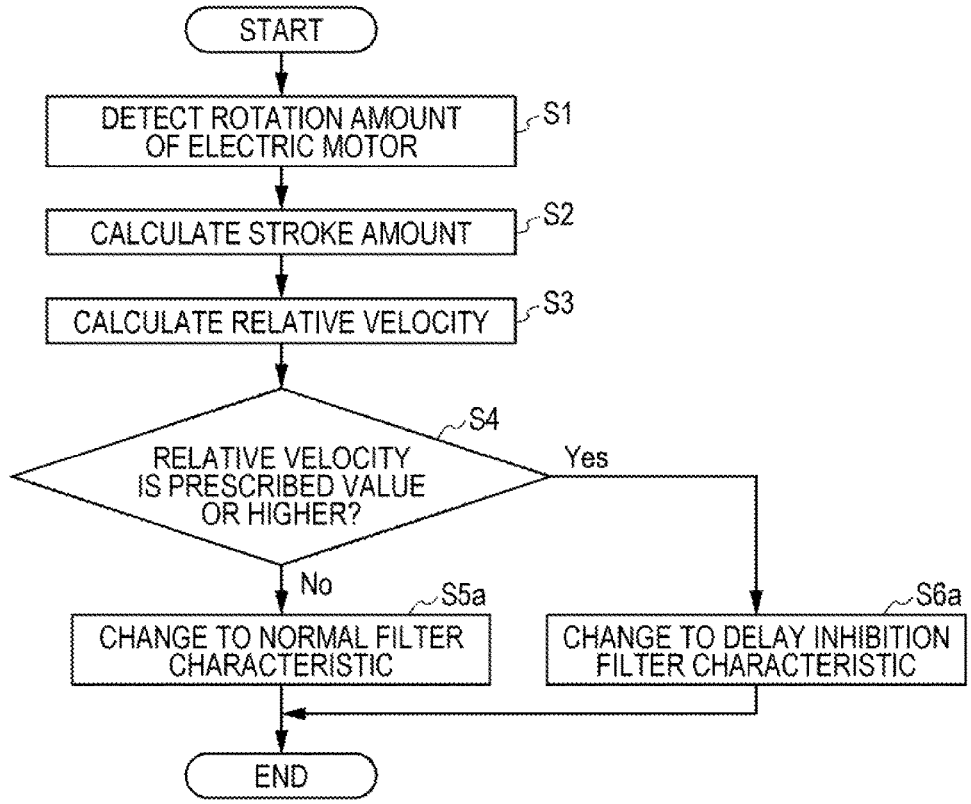
FIG. 7 is a flowchart that illustrates a flow of the control for obtaining the target vibration damping force from the stroke amount in a modification example.

FIG. 7 is a flowchart that illustrates a flow of the control for obtaining the target vibration damping force from the stroke amount in a modification example. Because the modification example shares each step of step S1 to step S4 in the flowchart illustrated in FIG. 5, a description will be made only about different step S5*a* and step S6*a*.

The modification example is different in a point that a digital type filter that functions as the filter unit is provided in the ECU and the gain characteristics of the filter are changed between a normal filter characteristic and a delay inhibition filter characteristic by using software which is not illustrated. The normal filter characteristic is the same as the gain characteristic of the normal filter 50 illustrated in FIG. 4, and the delay inhibition filter characteristic is the same as the gain characteristic of the delay inhibition filter 60 illustrated in FIG. 4.

In the modification example, in a case where the relative velocity is lower than the predetermined value (relative velocity<predetermined value), the relative velocity comparison determination unit 44 selects the normal filter characteristic (step S5*a*) and increases the gain G of only the unsprung resonance frequency range (f). On the other hand, in a case where the relative velocity is the predetermined value or higher (relative velocity≥predetermined value), the relative velocity comparison determination unit 44 selects the delay inhibition filter characteristic (step S6*a*) and increases the gain G of the high frequency range compared to the normal filter characteristic.

Figure 8A:
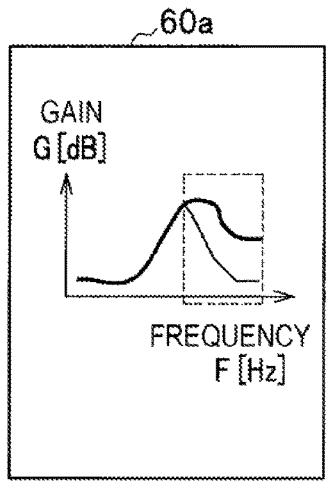
FIGS. 8A and 8B are explanatory diagrams that illustrate modification examples of a delay inhibition filter.
Figure 8B:
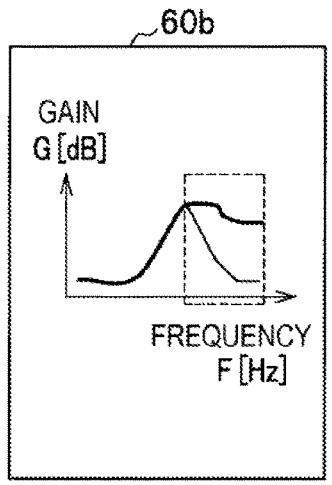

FIGS. 8A and 8B are explanatory diagrams that illustrate modification examples of the delay inhibition filter.

In this embodiment that is illustrated in FIG. 4, the delay inhibition filter is illustrated as a single filter that has a single gain characteristic. However, for example, as illustrated in FIGS. 8A and 8B, plural delay inhibition filters 60*a* and 60*b* may selectively be used.

The increase amount of the gain G in each high frequency range is set variable in accordance with the magnitude of the relative velocity that is the predetermined value or higher. For example, even if the relative velocity is the predetermined value or higher, in a case where the relative velocity is comparatively low, the delay inhibition filter 60a in which the increase amount of the gain G is comparatively small (see FIG. 8A) is selected. In a case where the relative velocity is comparatively high, the delay inhibition filter 60b in which the increase amount of the gain G is comparatively large (see FIG. 8B) is selected. Further, in a case where the relative velocity is the predetermined value or higher, the delay inhibition filter 60a in which the increase amount of the gain G is comparatively small and the delay inhibition filter 60b in which the increase amount of the gain G is comparatively large are gradually switched, and the gain G of the delay inhibition filter may thereby be changed.

In addition, instead of the delay inhibition filter, the normal filter 50 may be used by bypassing it. Further, instead of the delay inhibition filter, a band-pass filter (BPF) whose gain G of the unsprung resonance frequency range (f) is 1 (G=1) may be used.

Furthermore, in FIG. 4, the filter (the normal filter 50 or the delay inhibition filter 60) is selected after the relative velocity between the sprung mass and the unsprung mass of the vehicle is calculated. However, embodiments are not limited to this. For example, the positions of the filters 50 and 60 and the map 80 which are illustrated in FIG. 4 are switched, and the target vibration damping force is set based on the map 80 about the relationship characteristic between the stroke amount and the load. Subsequently, the filter (the normal filter 50 or the delay inhibition filter 60) that corresponds to the relative velocity is selected, and the filtering process may thereby be performed.

What is claimed is:

1. An electromagnetic damper system comprising:
    an electromagnetic damper provided with an electric motor that generates a driving force and configured to utilize the driving force to generate a vibration damping force against a force acting between a sprung mass of a vehicle and an unsprung mass of the vehicle, the vibration damping force being controlled based on a target damping force inputted to the electromagnetic damper;
    a relative velocity detection unit configured to detect a relative velocity between the sprung mass and the unsprung mass of the vehicle;
    a filter configured to perform a filtering of the relative velocity detected by the relative velocity detection unit according to gain characteristics of the filter through which the relative velocity passes, the filtering being performed with an increased gain characteristic of an unsprung resonance frequency range and with decreased gain characteristics of frequency ranges other than the unsprung resonance frequency range; and
    a target vibration damping force determining unit configured to determine the target vibration damping force to control the electromagnetic damper based on the relative velocity which passes through the filter,
    wherein in a case where the relative velocity detected by the relative velocity detection unit is a predetermined value or higher, the gain characteristics of the filter are changed such that a gain characteristic in a predetermined high frequency range is increased.

2. An electromagnetic damper system comprising:
    an electromagnetic damper provided with an electric motor that generates a driving force and configured to utilize the driving force to generate a vibration damping force against a force acting between a sprung mass of a vehicle and an unsprung mass of the vehicle, the vibration damping force being controlled based on a target damping force inputted to the electromagnetic damper;
    a relative velocity detection unit configured to detect a relative velocity between the sprung mass and the unsprung mass of the vehicle;
    a target vibration damping force determining unit configured to determine the target vibration damping force to control the electromagnetic damper based on the relative velocity which is detected by the relative velocity detection unit; and
    a filter configured to perform a filtering of the target vibration damping force determined by the target vibration damping force determining unit according to gain characteristics of the filter through which the target vibration damping force passes, the filtering being performed with an increased gain characteristic of the unsprung resonance frequency range and with decreased gain characteristics of frequency ranges other than the unsprung resonance frequency range, the filtered target damping force being utilized to control the electromagnetic damper,
    wherein in a case where the relative velocity detected by the relative velocity detection unit is a predetermined value or higher, the gain characteristics of the filter is changed such that a gain characteristic in a predetermined high frequency range is increased.

* * * * *